US012747614B2

(12) United States Patent
Miller et al.

(10) Patent No.: US 12,747,614 B2
(45) Date of Patent: Sep. 29, 2026

(54) ELECTROMECHANICAL LOCKS AND RELATED METHODS

(71) Applicant: LOCK II, LLC, Nicolasville, KY (US)

(72) Inventors: J. Clayton Miller, Nicholasville, KY (US); Michael P. Harvey, Laguna Niguel, CA (US)

(73) Assignee: LOCK II, LLC, Nicolasville, KY (US)

( * ) Notice: Subject to any disclaimer, the term of this patent is extended or adjusted under 35 U.S.C. 154(b) by 0 days.

(21) Appl. No.: 18/668,410

(22) Filed: May 20, 2024

(65) Prior Publication Data

US 2024/0344364 A1 Oct. 17, 2024

Related U.S. Application Data

(63) Continuation of application No. PCT/US2022/053327, filed on Dec. 19, 2022.

(Continued)

(51) Int. Cl.

| | |
|---|---|
| ***E05B 65/00*** | (2006.01) |
| ***E05B 37/00*** | (2006.01) |
| ***E05B 37/16*** | (2006.01) |
| *E05B 47/00* | (2006.01) |
| *E05G 1/04* | (2006.01) |

(52) U.S. Cl.

CPC ...... *E05B 65/0075* (2013.01); *E05B 37/0044* (2013.01); *E05B 37/16* (2013.01); *E05B 2047/0067* (2013.01); *E05G 1/04* (2013.01)

(58) Field of Classification Search

CPC ...... E05B 17/22; E05B 17/226; E05B 37/004; E05B 37/16; E05B 47/00; E05B 49/00; E05B 65/007; E05B 2047/0067; E05G 1/04; G07C 9/0069

See application file for complete search history.

(56) References Cited

U.S. PATENT DOCUMENTS

| | | | |
|---|---|---|---|
| 3,733,861 | A | 5/1973 | Lester |
| 4,745,784 | A | 5/1988 | Gartner |

(Continued)

FOREIGN PATENT DOCUMENTS

| | | | |
|---|---|---|---|
| CA | 2236986 | A1 | 11/1998 |
| CN | 1815517 | A | 8/2006 |

(Continued)

OTHER PUBLICATIONS

European Patent Office, Supplementary European Search Report in EP Application No. 21850794.5, Jul. 30, 2024.

(Continued)

*Primary Examiner* — Kristina R Fulton
*Assistant Examiner* — James Edward Ignaczewski
(74) *Attorney, Agent, or Firm* — Rooney IP, LLC

(57) ABSTRACT

A dial ring assembly for an electromechanical combination lock. The dial ring assembly includes a housing configured to be mounted on an exterior of a securable enclosure. A dial is rotatably disposed on the housing, the dial being rotatable about a dial axis for use in connection with entry of a combination and a sensor configured to detect a rotation of the dial. The sensor provides an output signal based at least in part on the rotation of the dial and wherein the sensor is configured to detect the rotation of the dial over a range of dial rotational speeds.

39 Claims, 7 Drawing Sheets

Related U.S. Application Data

(60) Provisional application No. 63/299,614, filed on Jan. 14, 2022.

(56) References Cited

U.S. PATENT DOCUMENTS 4,899,562 A 2/1990 Gartner et al.
5,061,923 A 10/1991 Miller et al.
5,184,491 A 2/1993 Schittenhelm
5,265,452 A 11/1993 Dawson et al.
5,410,301 A 4/1995 Dawson et al.
5,493,279 A 2/1996 Dawson et al.
5,493,882 A 2/1996 Jasper
5,517,184 A 5/1996 Miller et al.
5,604,489 A 2/1997 Hyatt, Jr.
5,613,388 A 3/1997 Murphree
5,640,862 A * 6/1997 Remenicky ......... E05B 47/0688 340/5.55
5,647,235 A 7/1997 Clark et al.
5,870,914 A 2/1999 Dawson
5,896,026 A * 4/1999 Higgins ............. G07C 9/00896 70/280
5,914,669 A 6/1999 Wicks et al.
6,076,383 A 6/2000 Clark et al.
6,218,955 B1 * 4/2001 Conklin ................... G07C 9/27 340/13.24
6,337,618 B1 1/2002 Craig et al.
6,494,067 B1 12/2002 Jasper
6,741,160 B1 * 5/2004 Dawson ............. G07C 9/00666 340/5.55
7,046,123 B1 5/2006 Goldberg
7,932,810 B2 4/2011 Gartner
8,091,392 B2 1/2012 Miller et al.
8,093,986 B2 1/2012 Harvey
8,516,863 B2 8/2013 Miller et al.
8,520,377 B2 8/2013 Senatori
8,635,893 B2 * 1/2014 Miller ..................... E05B 49/00 70/416
8,638,227 B2 1/2014 Yuan
8,902,042 B2 12/2014 Davis et al.
9,080,349 B2 7/2015 Burrus et al.
9,121,199 B2 9/2015 Li
9,650,808 B2 5/2017 Martel et al.
9,816,294 B2 11/2017 Burrus et al.
9,874,042 B2 1/2018 Gartner
9,995,060 B2 6/2018 Miller et al.
10,032,328 B2 * 7/2018 Horne ................... E05B 45/061
10,128,283 B2 11/2018 Bryla
10,190,335 B2 1/2019 Dehaven et al.
10,438,978 B2 10/2019 Bryla et al.
11,408,205 B2 8/2022 Piirainen
11,536,053 B2 12/2022 Ashcroft
11,661,787 B2 5/2023 Moyer
11,846,121 B2 12/2023 Miller
2003/0103324 A1 6/2003 Gallivan
2005/0280500 A1 * 12/2005 Miller ................ G07C 9/00912 340/5.55
2010/0180649 A1 * 7/2010 Harvey ................... E05B 49/00 70/277
2014/0109632 A1 4/2014 Horne et al.
2014/0165678 A1 * 6/2014 Burrus ...................... E05C 1/02 70/279.1
2014/0225375 A1 8/2014 Chang
2017/0051531 A1 2/2017 Min et al.
2018/0051481 A1 2/2018 Miller et al.
2018/0051482 A1 2/2018 Miller et al.
2018/0283050 A1 10/2018 Miller et al.
2019/0119949 A1 4/2019 Roatis et al.
2019/0131818 A1 5/2019 Bryla et al.
2019/0169879 A1 6/2019 Miller et al.
2020/0095802 A1 3/2020 Miller et al.
2020/0095803 A1 3/2020 Miller et al.
2020/0141157 A1 * 5/2020 Miller ................ H02K 11/0094
2020/0318393 A1 * 10/2020 Miller ..................... E05B 47/00
2021/0388641 A1 12/2021 Ashcroft

FOREIGN PATENT DOCUMENTS

CN 102071838 A 5/2011
CN 103732844 A * 4/2014 ............. E05B 47/06
DE 3208818 A1 9/1983
EP 0552115 A1 7/1993
EP 0712983 A2 5/1996
EP 0807732 A2 11/1997
EP 1818874 A1 8/2007
EP 2998490 A1 3/2016
GB 2495848 A 4/2013
KR 20040093937 A 11/2004
KR 20060092498 A 8/2006
KR 100690629 B1 3/2007
WO 9929987 A1 6/1999
WO 0023679 A2 4/2000
WO 2018222817 A1 12/2018
WO WO-2022026556 A1 * 2/2022 ........... E05B 17/226

OTHER PUBLICATIONS

Kaba Mas, Operating Instructions, X-10, Type 1F High Security Electronic Lock, Document No. 539.0512, 2002-2018.
Kaba Mas, Operating Instructions, X-10, Type 1F High Security Electronic Lock, Document No. 519.0112, 2002-2013.
Federal Specification, Locks, Combination, Electromechanical, FF-L-2740B, Jun. 15, 2011, Superceding FF-L-2740A, Jan. 1997.
U.S. Patent and Trademark Office, International Search Report and Written Opinion in related PCT Application No. PCT/US2021/043470, Dec. 20, 2021.
U.S. Patent and Trademark Office, International Preliminary Report on Patentability in related PCT Application No. PCT/US2021/043470, Feb. 9, 2023.
U.S. Patent and Trademark Office, International Search Report and Written Opinion in corresponding PCT Application No. PCT/US22/53327, May 12, 2023.
U.S. Patent and Trademark Office, International Preliminary Report on corresponding Patentability in PCT Application No. PCT/US2022/053327, Apr. 8, 2024.
KR200322375 Machine Translation PE2E Search (Year: 2024).
U.S. Patent and Trademark Office, Office Action in U.S. Appl. No. 18/096,068, Feb. 12, 2025.

* cited by examiner

ELECTROMECHANICAL LOCKS AND RELATED METHODS

CROSS-REFERENCE TO RELATED APPLICATIONS

This application is a continuation of PCT Application Serial No. PCT/US2022/053327, filed Dec. 19, 2022 (pending) which claims the priority of U.S. Provisional Patent Application Ser. No. 63/299,614 filed on Jan. 14, 2022 (expired), the disclosures of which are incorporated herein by reference in their entirety. This application is also generally related to the disclosure in U.S. patent application Ser. No. 18/096,068, filed on Jan. 12, 2023 (pending), the disclosure of which is incorporated by reference herein.

TECHNICAL FIELD

Embodiments relate generally to locks, and, more specifically, to high-security electromechanical combination locks for use in connection with safes and other secured containers, enclosures, and any other security components. Embodiments also relate to methods involving such locks.

BACKGROUND

Enclosures, which may be rooms, safes, cabinets and the like, are used to securely store highly valuable and highly sensitive items. In some circumstances, it may be advisable to utilize high-security locks, such as high-security electromechanical combination locks, on such securable enclosures. Typically, for example, a high-security electromechanical lock would be used on a door or other access component of the enclosure. Some high-security electromechanical combination locks may be configured for operation independent of externally supplied electrical power.

Some known high-security electromechanical locks rely on various sensors to detect rotation of a combination dial. High-security electromechanical locks may require a consistent or near consistent angular rotation of the combination dial to enter a combination. Some high-security electromechanical locks may require a minimum angular rotation of the combination dial while entering a combination, for example. Failing to maintain a consistent or minimum angular rotation of the combination dial while entering a combination may result in an erroneous combination being entered and a user being unable to unlock the lock, for example. Maintaining a consistent or minimum angular rotation of the combination dial while entering a combination may require a user to spend more time than may otherwise be necessary to enter a combination, for example. Turning a combination dial at a consistent or minimum angular rotation may be difficult for some users.

It would be desirable to provide additional advancements related to high-security electromechanical combination locks, particularly for such locks that include a combination dial that must be rotated to enter a combination and sensors for detecting dial rotation.

SUMMARY

The invention generally relates to a dial ring assembly for an electromechanical combination lock. The dial ring assembly includes a housing configured to be mounted on an exterior of a securable enclosure. A dial is rotatably disposed on the housing, the dial being rotatable about a dial axis for use in connection with entry of a combination and a sensor is configured to detect a rotation of the dial. The sensor provides an output signal based at least in part on the rotation of the dial and the sensor may be configured to detect the rotation of the dial over a range of dial rotational speeds. The sensor may be any suitable sensor, for example, such as a Hall effect sensor, or an optical sensor.

The sensor may be configured to detect a direction of the rotation. A resolution of the output signal of the sensor may dynamically change based on a rotation speed of the dial. An external generator may be configured to generate electrical energy, e.g., the external generator is operatively coupled to the dial such that rotation of the dial causes the external generator to produce electrical energy. The external generator may include the sensor.

An electronic display may be disposed on the housing, the electronic display being configured to display at least one indicium associated with entry of the combination. The sensor may be configured to communicate with the electronic display.

The dial ring assembly may further comprise a processor, wherein the processor is configured to communicate with the sensor. The processor may be configured to communicate with the electronic display.

In another illustrative aspect, the invention provides an electromechanical combination lock including a dial ring assembly and a lock assembly comprising a bolt, the bolt being selectively extendable and retractable. The lock assembly includes the sensor. The lock assembly may further include an internal generator, wherein the internal generator is configured to generate electrical energy and wherein the internal generator is operatively coupled to the dial such that rotation of the dial causes the internal generator to produce electrical energy. The internal generator may include the sensor.

In another illustrative aspect, a securable enclosure includes a plurality of walls at least partially defining an interior, and an access component is arranged to selectively close an opening through the plurality of walls. A lock in accordance herewith is disposed on one of the door or one of the plurality of walls. The lock is configured to secure the door in a closed position.

In another illustrative aspect, a dial ring assembly for an electromechanical combination lock includes a housing configured to be mounted on an exterior of a securable enclosure, and a dial rotatably disposed on the housing. The dial is rotatable about a dial axis for use in connection with entry of a combination, an external generator is configured to generate electrical energy and a sensor is configured to detect a rotation of the dial. The external generator is operatively coupled to the dial such that rotation of the dial causes the external generator to produce electrical energy. The sensor provides an output signal based at least in part on the rotation of the dial and the sensor is configured to detect the rotation of the dial over a range of dial rotational speeds. Other features may be provided as set for the herein.

In another illustrative aspect, a dial ring assembly for an electromechanical combination lock includes a housing configured to be mounted on an exterior of a securable enclosure, and a dial rotatably disposed on the housing, the dial being rotatable about a dial axis for use in connection with entry of a combination. An external generator is configured to generate electrical energy and a sensor is configured to detect a rotation of the dial. The external generator is operatively coupled to the dial such that rotation of the dial causes the external generator to produce electrical energy, and the external generator includes the sensor. The sensor provides an output signal based at least in part on the rotation of the dial. The sensor is configured to detect the rotation of the dial over a range of dial rotational speeds wherein a resolution of the output signal of the sensor dynamically changes based on a rotation speed of the dial.

In another illustrative aspect, a method of manufacturing a security device is provided. The method includes assembling a dial ring assembly, comprising providing a housing configured to be mounted on an exterior of a securable enclosure, disposing an external generator in the housing, the external generator being configured to generate electrical energy through rotation of an external generator shaft of the external generator, disposing a sensor on the external generator, the sensor being configured to detect a rotation and produce an output signal, rotatably disposing a dial on the housing, the dial being rotatable about a dial axis for use in connection with entry of a combination and operatively connecting the dial and the external generator shaft such that rotation of the dial rotates the external generator shaft to produce electrical energy and an output signal from the sensor. The electronic display may be located on the housing, and the electronic display may be configured to display at least one indicium associated with entry of the combination. The method may further include installing the dial ring assembly on an exterior of one of a wall or a door of a securable enclosure and installing a lock assembly on an interior of one of the walls and the door, including operatively connecting the dial ring assembly and the lock assembly through one of the wall or the door.

In another illustrative aspect, a method of operating an electromechanical combination includes entering a combination by rotating a dial disposed on a dial ring assembly about a dial axis, wherein rotating the dial comprises producing electrical energy by rotating an external generator shaft of an external generator disposed in a housing of the dial ring assembly and generating an output signal based at least partly on the rotation of the dial and viewing at least one indicium associated with the combination on an electronic display disposed on the housing. Entering the combination may comprise axially displacing the dial along the dial axis in a single press to actuate at least one switch and in a double press to change between at least two modes. Entering the combination may comprise activating a switch to change between at least two modes. The step of entering the combination may further comprise viewing one of a random alphabetic character, a random numeric character, and a random symbol, selecting one of an alphabetic mode, a numeric mode, and a symbol mode, and entering a combination element.

Various other aspects of the invention will be appreciated upon review of the detailed description of illustrative aspects and embodiments herein.

DETAILED DESCRIPTION

Illustrative embodiments according to at least some aspects of the present disclosure are described and illustrated below and include devices and methods relating to security devices including locks, such as electromechanical combination locks, and securable enclosures utilizing such locks. It will be apparent to those of ordinary skill in the art that the embodiments discussed below are illustrative examples and may be reconfigured without departing from the scope and spirit of the present disclosure. It is also to be understood that variations of the exemplary embodiments contemplated by one of ordinary skill in the art shall concurrently comprise part of the instant disclosure. The illustrative embodiments as discussed below may include optional steps, methods, and features that one of ordinary skill should recognize as not being a requisite to fall within the scope of the present disclosure.

The present disclosure includes, inter alia, security devices including high-security electromechanical combination locks for use on securable enclosures, and related methods. Some illustrative embodiments according to at least some aspects of the present disclosure relate to security devices, including securable enclosures such as safes, filing cabinets, security containers, vaults, secure rooms, and the like.

Figure 1:
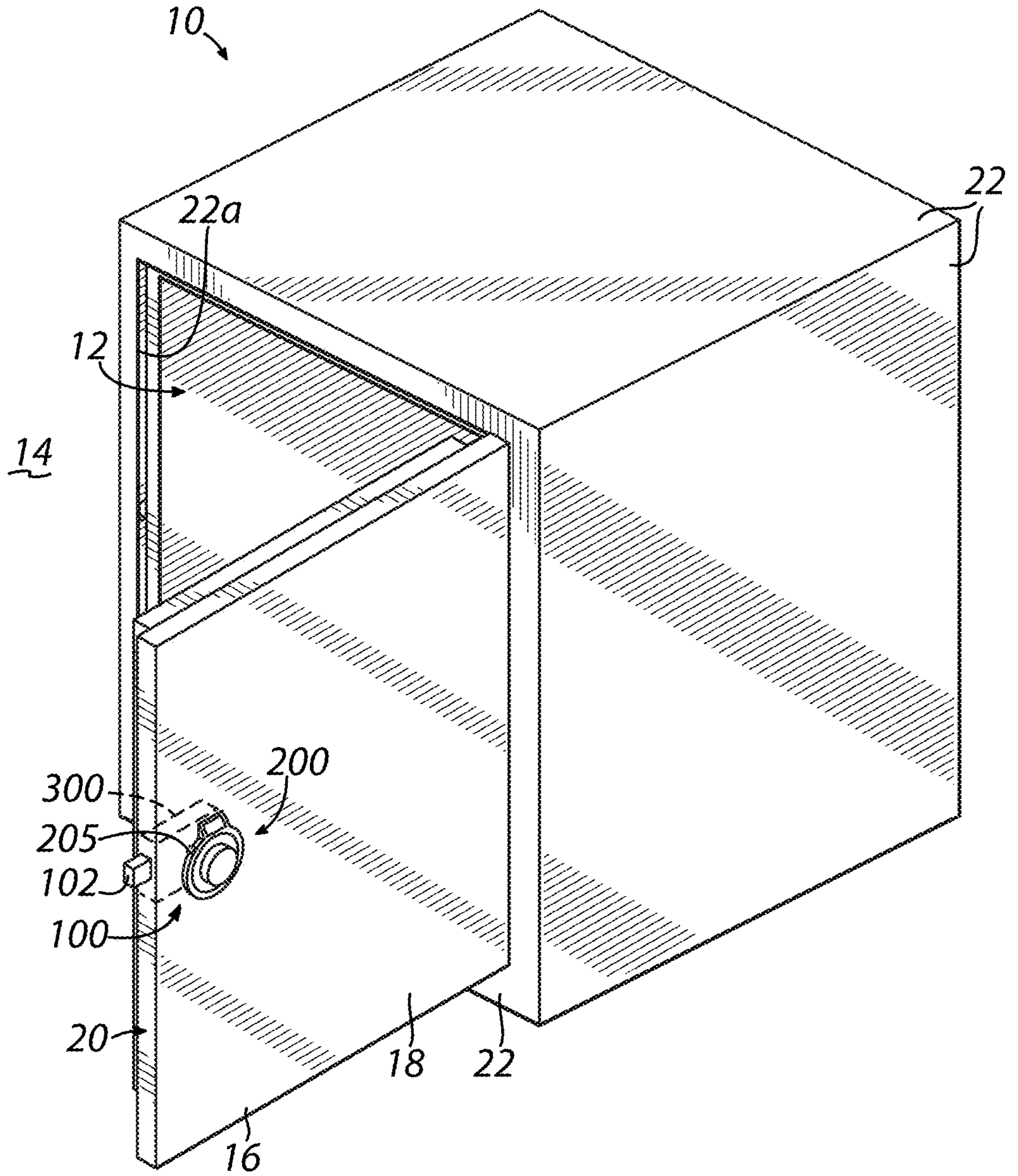
FIG. 1 is an isometric view of an illustrative securable enclosure including an illustrative electromechanical combination lock.

FIG. 1 is an isometric view of an illustrative securable enclosure 10 including an illustrative electromechanical combination lock 100, according to at least some aspects of the present disclosure. The securable enclosure 10 is generally in the form of a safe configured to securely contain highly valuable and/or highly sensitive articles therein and includes an interior 12, which is at least partially defined by a plurality of walls 22. The interior 12 of the enclosure 10 is selectively accessible from an exterior 14 of the enclosure 10, such as via a repositionable (e.g., hinged) door 16 operatively arranged to selectively close an opening **22*a* in the walls 22**.

In this illustrative embodiment, the lock 100 is mounted to the door 16 and includes a selectively extendable and retractable bolt 102, which is configured to secure the door 16 in a closed position. The illustrative lock 100 includes a dial ring assembly 200 disposed on the exterior 18 of the door 16 and a lock assembly 300 disposed on the interior 20 of the door 16. Generally, the lock assembly 300 may include various structures and features, such as the bolt 102, as may be necessary to perform the functions of the lock assembly 300 as described herein.

In alternative embodiments, the securable enclosure 10 may be in the form of another type of security device or container (e.g., a filing cabinet) or may be in the form of a larger secure area, such as a vault or a secure room. In some embodiments, the lock 100 may be mounted on the securable enclosure 10 (e.g., on a wall 22) proximate the door 16, rather than on the door 16. In some embodiments, the bolt 102 of the lock 100 may act directly to secure the door 16 in the closed position, or the bolt 102 may act in connection with a mechanism, such as boltworks, to secure the door 16 in the closed position.

Figure 2:
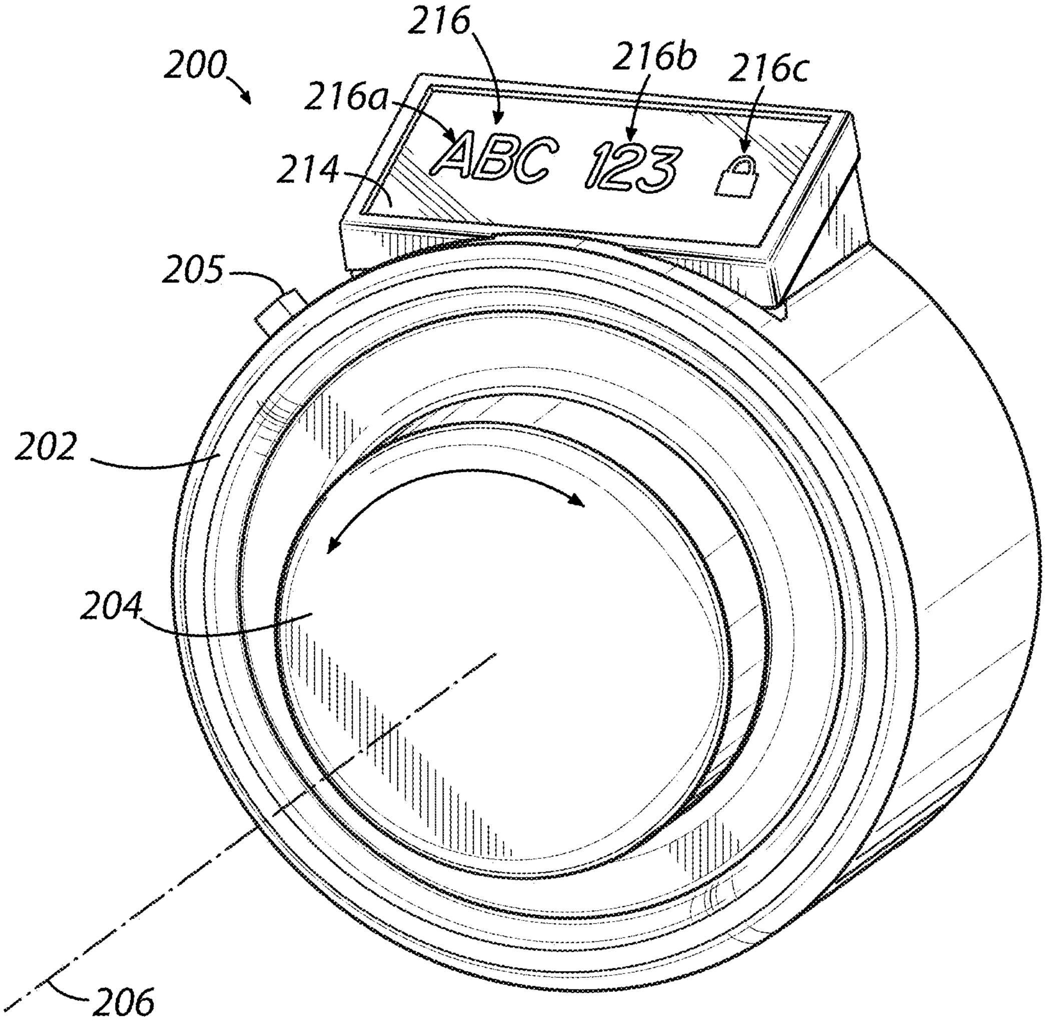
FIG. 2 is an isometric view of an illustrative dial ring assembly of the electromechanical combination lock of FIG. 1.

Referring to FIG. 2, the illustrative dial ring assembly 200 includes a housing 202 configured to be mounted on the exterior 18 of the enclosure 10 (see FIG. 1). A combination entry component, such as a rotatable dial 204, is rotatably disposed on the housing 202. The dial 204 is rotatable about a dial axis 206, such as for use in connection with the entry of a combination by a user. In some embodiments, the dial 204 may be easily rotatable by a user's finger tips to facilitate ease of dialing. For example, the dial torque may be about 16 to 20 inch-ounces (0.113 to 0.141 N-m). The dial axis 206 may be generally perpendicular to the generally flat exterior 18 of the enclosure 10.

In this illustrative embodiment, a switch 205 is mounted to the housing 202 and oriented that such that the switch 205 may be operated by a user's thumb and/or finger in conjunction with the user operating the dial 204, for example. The switch 205 may be a push button, for example. The switch 205 may be radially displaceable inward toward the center of the dial 204. The switch 205 may be biased radially outward away from the center of the dial 204. Pressing the switch 205 radially inward toward the center of the dial 204 may actuate the switch 205 and be operative to enter an element of a combination, toggle between modes (e.g., between alphabetic characters, numeric characters, and/or any other symbols or characters of any type), and/or otherwise facilitate communication between the user and the lock 100. For example, a single press of the switch 205 may be used to enter an input (e.g., a selected element of a combination or a selection from a menu) and/or a double press may be used to change modes as described further below, for example, in connection with changing the type of character being input (e.g., alphabetic, numeric, symbol, etc.).

Figure 3:
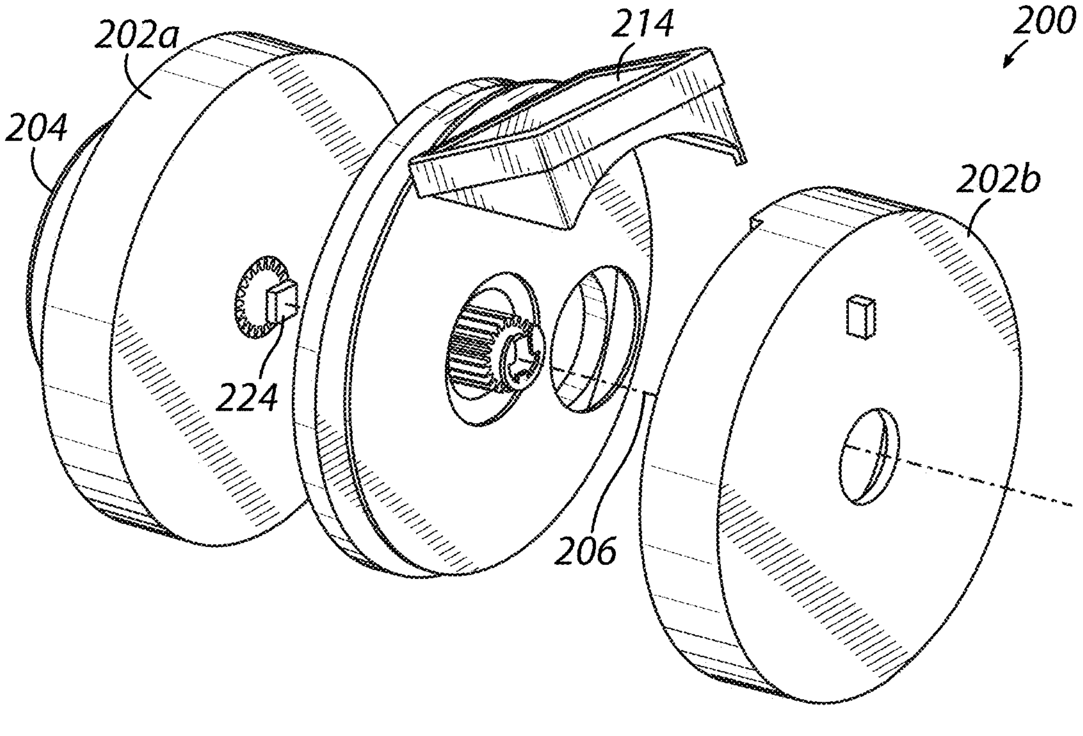
FIG. 3 is an exploded, rear isometric view of the dial ring assembly of FIG. 2.

Referring to FIGS. 2 and 3, the illustrative housing 202 includes a first, outer portion 202*a* receiving the dial 204 and a second, inner portion 202*b*, which is disposed against the exterior 18 of the enclosure 10 (see FIG. 1). The illustrative dial ring assembly 200 includes a display, such as an electronic display 214, disposed on the housing 200 for viewing by a user. In some example embodiments, the electronic display may comprise a dot matrix display. The display 214 may comprise an organic light-emitting diode ("OLED") display and/or an E Ink ("electronic ink") display, for example. The electronic display 214 is configured to display one or more indicia 216 associated with operation of the lock 100, such as one or more alphabetic characters 216*a*, one or more numeric characters 216*b*, and/or one or more symbols 216*c*. The indicia 216 may be used in connection with entering a combination and/or changing a combination, for example. The display 214 is substantially planar and is oriented substantially transversely to the dial axis 206 (e.g., at about 45 degrees). As used herein, "transverse" may refer to relative angular orientations that are non-parallel (e.g., perpendicular or oblique). In alternative embodiments, the display 214 may be mounted in other orientations or positions.

Figure 4:
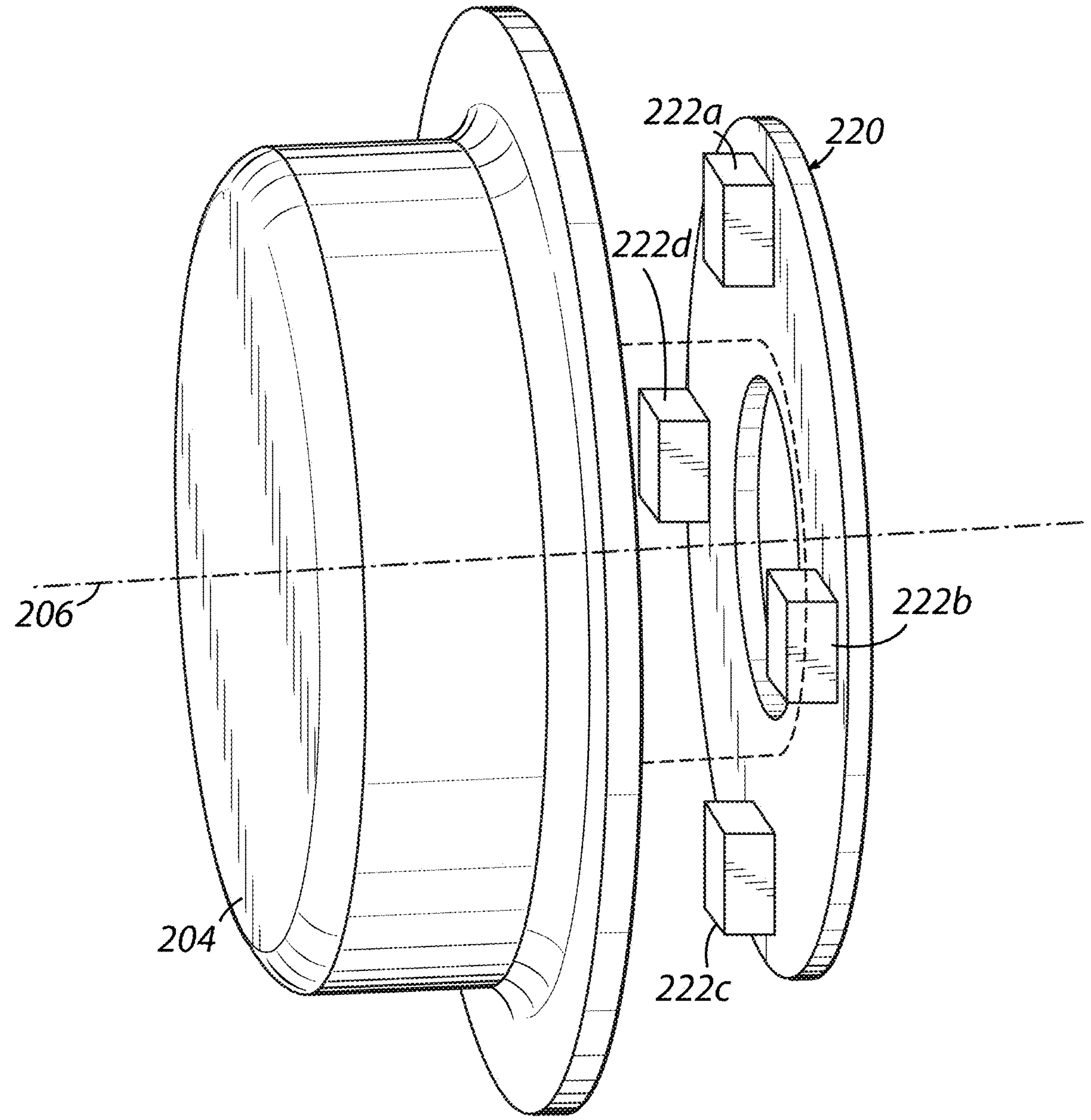
FIG. 4 is an exploded isometric view of the dial of FIG. 2 and an illustrative dial switch assembly.

FIG. 4 is an exploded isometric view of the dial 204 and an illustrative dial switch assembly 220, according to at least some aspects of the present disclosure. Referring to FIGS. 2 and 4, in the illustrative dial ring assembly 200, the dial switch assembly 220 is mounted inside the housing 202 and the dial 204 is mounted to the housing 202 such that the dial 204 is axially displaceable (e.g., along the dial axis 206) inward toward the housing 202. The dial 204 may be biased (e.g., by a spring or wave washer, or by magnets arranged to repel one another) axially outward away from the enclosure 10 (see FIG. 1). Pressing the dial 204 axially inward in the direction of the enclosure 10 may actuate one or more switches 222*a*, 222*b*, 222*c*, 222*d* disposed on the dial switch assembly 220. Actuation of the one or more switches 222*a*, 222*b*, 222*c*, 222*d* may be operative to enter an element of a combination, toggle between modes (e.g., between alphabetic characters, numeric characters, symbols and/or characters of any type), and/or otherwise facilitate communication between the user and the lock 100. For example, a single press of the dial 204 may be used to enter an input (e.g., a selected element of a combination or a selection from a menu) and/or a double press may be used to change modes.

Figure 5:
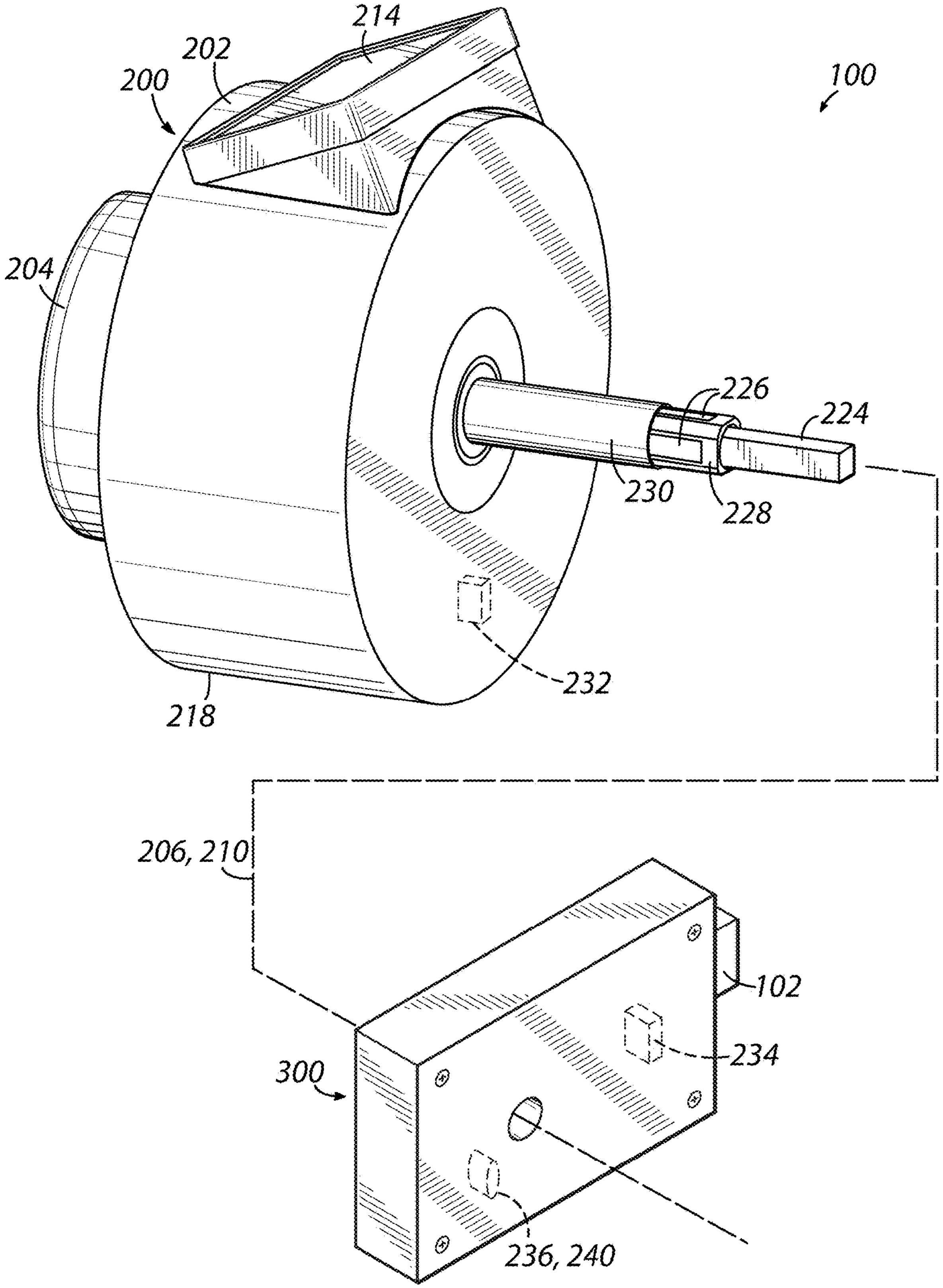
FIG. 5 is a rear isometric exploded view of the electromechanical combination lock of FIG. 1.

Referring to FIGS. 1 and 5, the lock 100 may include one or more connections, such as mechanical connections, electrical connections, data connections, etc., between the exterior dial ring assembly 200 and the internal lock assembly 300, such as through the door 16 or wall 22 of the enclosure 10. The illustrative lock 100 includes a rotatable spindle 224, which is configured to extend from the dial ring assembly 200 to the lock assembly 300. In this illustrative embodiment, one or more electrical conductors 226 extend between the dial ring assembly 200 and the lock assembly 300. The conductors 226 are disposed on the radially outer surface of a generally cylindrical power tube 228. The power tube 228 is substantially hollow and receives the rotatable spindle 224 therethrough. The power tube 228 may be housed radially within an outer tube 230. Any other suitable manner of conducting electrical power and/or signals may be used instead of, or in addition, to the power tube 228.

The illustrative dial ring assembly 200 includes an external processor 232 disposed in the housing 202, which is configured to communicate with an internal processor 234 disposed within the interior of the enclosure 10, such as in the lock assembly 300. For example, the external processor 232 and the internal processor 234 may be configured for encrypted infrared data transfer therebetween, such as through the outer tube 230. In some exemplary embodiments, the processors 232, 234 may be synchronized and/or may be matched at the time of manufacture, for example by matching serial numbers.

The external processor 232 is configured to perform various functions associated with operation of the lock 100. For example, the external processor 232 may monitor rotation of the dial 204, such as directional information from sensors associated with rotation of the dial 204 to increment and/or decrement the display electronics. The external processor 232 may control and/or update the information shown on the display 214. The external processor 232 may control the internal processor 234, such as via a two-wire tube system and/or an infrared communication system. The external processor 232 may transmit the user dial inputs to the internal processor 234, which may subsequently detect the combination entry. The external processor 232 may shut down the power to the internal processor 234 and/or the external processor 232, and/or may signal to shut down the internal power. The external processor 232 may coordinate, such as through the display 214, combination entry and/or storage for the internal processor 234. The external processor 232 may control the display of pertinent lock status (e.g., locked and/or unlocked) on the display 214. The external processor 232 may compute and/or display random initial characters on the display 214 during combination entry. The external processor 232 may impose dialing delays when excessive combination entries have been attempted. The external processor 232 may accept information from the internal processor 234, such as information indicating that the correct combination was entered. The external processor 232 may maintain pertinent information for encrypting and display for the supervisor coordinator. The external processor 232 may store audit trail information, such as time of entry tries, user opening tries, etc. Other electronics in the dial ring assembly 200 may also perform various functions associated with operation of the lock 100. For example, some electronics may rectify the phase signals from an electrical power generator (e.g., a three-phase generator). Some electronics may sense the rotational direction and/or position of the dial 204 and/or other components (e.g., a generator).

The internal processor 234 is configured to perform various functions associated with operation of the lock 100. For example, the internal processor 234 may accept combination entries from the external processor 232. The internal processor 234 may maintain the opening combinations. The internal processor 234 may compare the combination entered to a desired combination. The internal processor 234 may activate motor drive electronics if a correct combination is entered. The internal processor 234 may communicate to external electronics that the entered combination is correct, or has failed. The internal processor 234 may output audit trail information to a supervisor (e.g., with the securable container open). The internal processor 234 may input biometric or card information to enable lock operation (this may also be implemented from the dial ring). Generally, the internal processor 234 may operate as a secondary element in a primary/secondary relationship with the external processor 232. Other electronics in the lock assembly 300 may also perform various other functions associated with operation of the lock 100. Some electronics may facilitate communication between the internal processor 234 and the external processor 232. Some electronics may comprise motor drive electronics configured to facilitate operation of a motor arranged to engage the mechanism to retract and/or extend the bolt 102. Some electronics may facilitate start up and/or shut down of various other electronics. Some electronics may be associated with electrical power storage (e.g., capacitors) providing electrical power for various other components. Some electronics may facilitate combination entry and/or audit trail detection initiation and/or communication.

In this illustrative embodiment, the lock assembly 300 includes an internal electrical generator 236. The internal electrical generator 236 may be configured for rotation by the spindle 224 so that the internal electrical generator 236 produces electrical energy. The internal electrical generator 236 may be utilized in connection with detecting rotation of the dial 204, such as for detecting rotation of the dial 204 in connection with a user entering a combination. For example, a sensor 240 may be integrated into the internal electrical generator 236 to provide an output signal corresponding to the rotation of the dial 204 by the user. In some embodiments, the sensor 240 may be configured to detect the direction of the rotation of the dial 204. In some embodiments, the sensor 240 may be a Hall effect sensor. In some embodiments, the sensor 240 may be an optical sensor. The sensor 240 may be configured to detect the rotation of the dial 204 over a range of dial rotational speeds. The sensor 240 may be configured to detect when a user rotates the dial 204 at very slow speeds, for example. While in this illustrative embodiment the sensor 240 is integrated into the internal electrical generator 236, in alternate embodiments the sensor 240 may be independently located elsewhere in the lock assembly 300.

Figure 6:
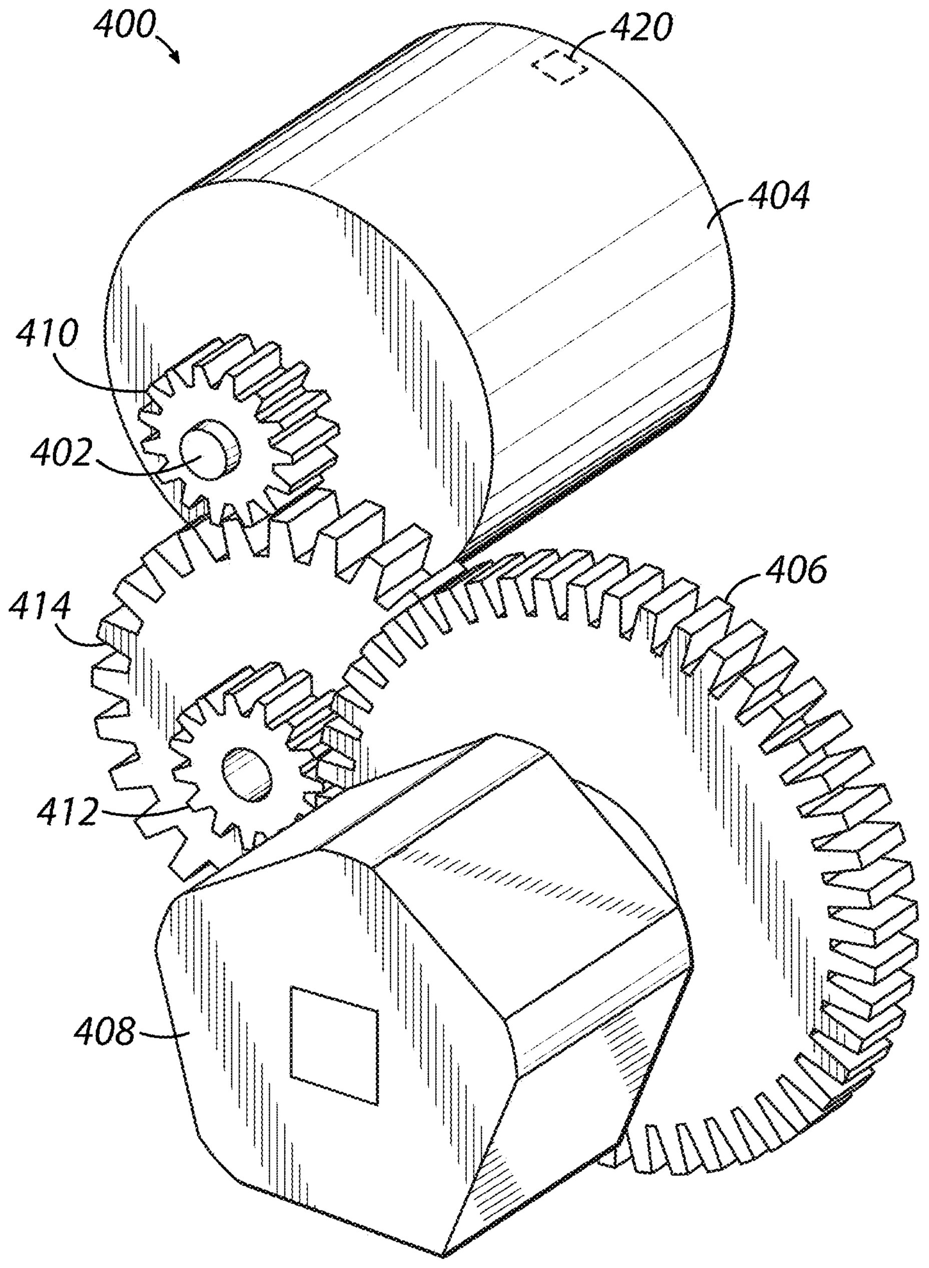
FIG. 6 is a front isometric view of a portion of an illustrative gear train disposed in the housing of the dial ring assembly of FIG. 2.

FIG. 6 is a front isometric view of a portion of an illustrative gear train 400 disposed in the housing 202 of the dial ring assembly 200. Referring to FIGS. 2 and 6 the illustrative gear train 400 is configured to rotate an external generator shaft 402 of an external electrical generator 404 disposed in the housing 202 to produce electrical energy when the dial is rotated about the axis 206. Generally, rotation of the dial 204 rotates the dial drive gear 406, which engages and rotates the first intermediate gear 412, which is coupled to and rotates the second intermediate gear 414, which engages and drives the external generator shaft driven gear 410, which is coupled to and rotates the external generator shaft 402. Accordingly, rotation of the dial 204 rotates the external generator shaft 402 to produce electrical energy. The external electrical generator 404 may be utilized in connection with detecting rotation of the dial 204, such as for detecting rotation of the dial 204 in connection with a user entering a combination. For example, a sensor 420 may be integrated into the external electrical generator 404 to provide an output signal corresponding to the rotation of the dial 204 by the user. In some embodiments, the sensor 420 may be configured to detect the direction of the rotation of the dial 204. In some embodiments, the sensor 420 may be a Hall effect sensor. In some embodiments, the sensor 420 may be an optical sensor. The sensor 420 may be configured to detect the rotation the dial 204 over a range of dial rotational speeds. The sensor 420 may be configured to detect when a user rotates the dial 204 at very slow speeds, for example. While in this illustrative embodiment the sensor 420 is integrated into the external electrical generator 404, in alternate embodiments the sensor 420 may be independently located elsewhere in the dial ring assembly 200.

In some embodiments, a resolution of the output signal of the sensors 240, 420 may dynamically change based on a rotation speed of the dial 204. For example, when a user approaches a desired number, letter, or symbol, and slows the rotation speed of the dial 204, a reduced output signal resolution may make it easier for a user to select the desired number, letter, or symbol. When the user rotates the dial 204 faster, the output signal may change the number, letter, or symbol displayed on the electronic display 214 faster than when the user rotates the dial 204 slower, for example. Rotating the dial 204 faster may allow the generators 240, 420 to generate more electrical power while also allowing a user to select a desired number, letter, or symbol more quickly, for example.

Some exemplary embodiments including both an internal electrical generator 236 and an external electrical generator 404 may not require electrical conductors configured to conduct electrical power between the dial ring assembly 200 and the lock assembly 300 as each assembly 200, 300 comprises a respective generator 236, 404. Exemplary embodiments including an internal electrical generator 236 and an external electrical generator 404 may include electrical power storage devices (e.g., power storage capacitors) in both the dial ring assembly 200 and the lock assembly 300.

Figure 7:
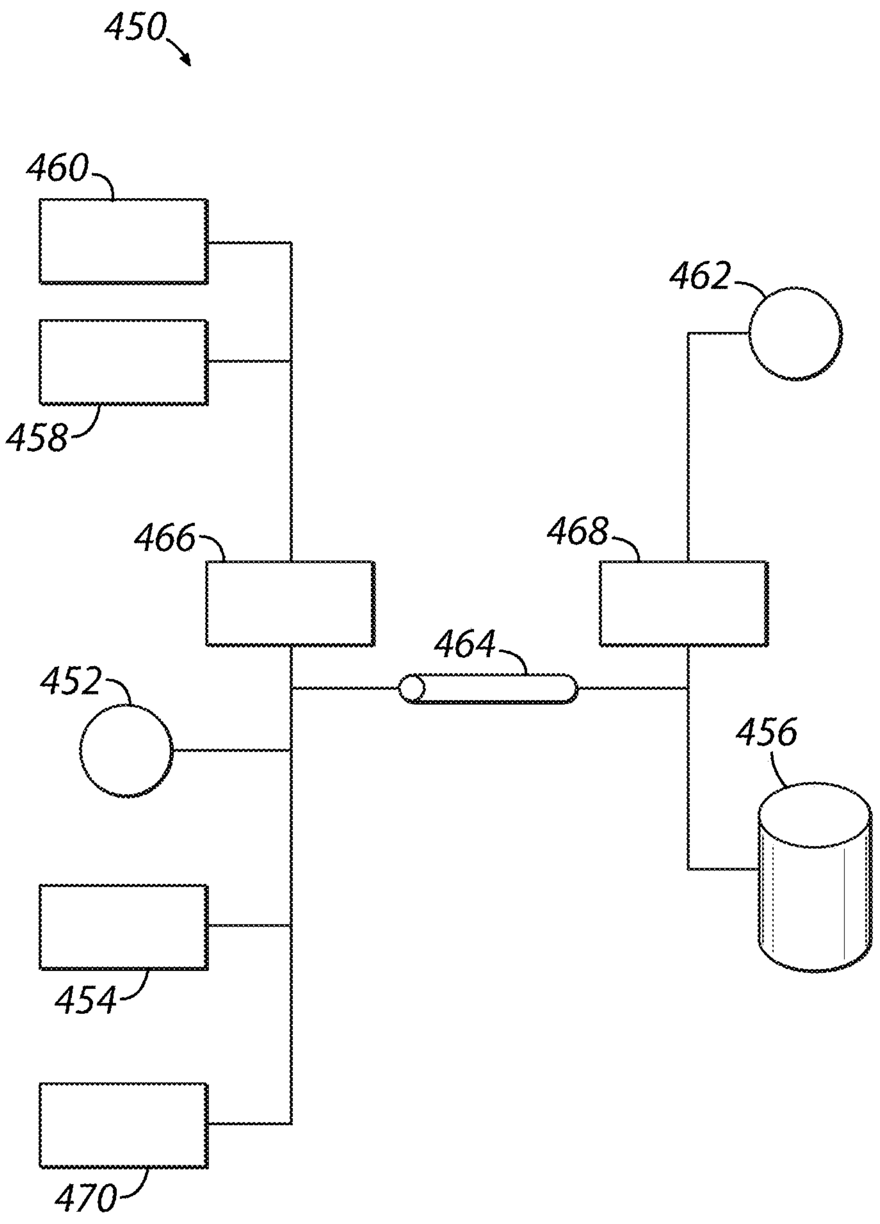
FIG. 7 is a simplified schematic diagram showing an illustrative electrical arrangement for an electromechanical lock.

FIG. 7 is a simplified schematic diagram showing an illustrative electrical arrangement 450 for an electromechanical lock 100 (see FIG. 5), according to at least some aspects of the present disclosure. Electrical power sources, such as one or more generators 452 (e.g., generators 236, 404) produce electrical energy, which is stored in one or more electrical energy storage devices 456 (e.g., a capacitor energy storage device, such as a super capacitor). The generator 452 may include, for example, a 3-phase motor generator with each phase coupled to the power bus via a rectifier. In some exemplary embodiments, electrical power may be routed between the interior of the securable enclosure and the exterior of the securable enclosure (and vice versa) via a power tube 464. Electrical energy is provided for use by various components of the lock 100, such as one or more processors 458 (e.g., processors 232, 234), one or more displays 460 (e.g., electronic display 214), and/or one or more components 462 of the lock assembly 300 (e.g., one or more motors and/or solenoids). Electrical energy may be supplied to various loads via one or more regulators, such as low voltage regulators 466, 468. One or more sensors 470 (e.g., sensors 240, 420) detect rotation of the dial 204 (see FIG. 2). Electrical energy is provided for use by various components of the lock 100, such as one or more processors 458 (e.g., processors 232, 234), one or more displays 460 (e.g., electronic display 214), one or more sensors 470 (e.g., sensors 240, 420), and/or one or more components 462 of the lock assembly 300 (e.g., one or more motors and/or solenoids). Electrical energy may be supplied to various loads via one or more regulators, such as low voltage regulators 466, 468. Electrical energy and/or signals may be conducted via a power tube, such as power tube 464, or via any other desired manner such as standard cable, ribbon cable, or other electrical conductor components.

Referring to FIGS. 1-5, generally, the lock 100 may be operated as follows. A user may rotate and/or depress the dial 204 as necessary to enter the combination for the lock 100. If necessary, the user may rotate the dial 204 to produce electrical energy for operation of the lock 100 prior to entering the combination. The method may include entering a combination by rotating the dial 204, including producing electrical energy by rotating the external generator shaft 402 of the external generator 404. Rotating the dial 204 may produce electrical energy with the internal electrical generator 236. The method may include viewing at least one indicium 216 associated with the combination on the electronic display 214 disposed on the housing 202. The method may include pushing the switch 205 in a single press. The method may include pushing the switch 205 in a double press to change between at least two modes. The method may include axially displacing the dial 204 along the dial axis 206 in a single press to actuate at least one switch **222*a*, 222*b*, 222*c*, 222*d*. The method may include axially displacing the dial 204 along the dial axis 206 in a double press to change between at least two modes. After the correct combination has been entered, the lock assembly 300 may operatively couple the spindle 224 to the bolt 102 to allow the bolt 102 to be retracted. After retracting the bolt 102 and operating other locking devices associated with the enclosure 10 (e.g., boltworks), the door 16** may be opened.

An illustrative method of manufacturing a security device is described. The method includes assembling a dial ring assembly 200, including providing a housing 202, disposing an external generator 404 in the housing 202, mounting a sensor 420 within the housing, rotatably mounting a dial 204 on the housing, and disposing a gear train 400 in the housing 202. The method may include locating a switch 205 on the housing. The method may include disposing an electronic display 214 on the housing 202. The method may include installing the dial ring assembly 200 on an exterior of a wall 22 or a door 16 of a securable enclosure 10, installing a lock assembly 300 on an interior of the wall 22 or the door 16, and/or operatively connecting the dial ring assembly 200 and the lock assembly 300 through the wall 22 or the door 16.

An illustrative method of installing the illustrative lock 100 is described. The method includes mounting the dial ring assembly 200 on an exterior of a wall 22 or a door 16 of the securable enclosure 10. The method may include mounting the lock assembly 300 on an interior of the wall 22 or the door 16 and/or operatively connecting the dial ring assembly 200 and the lock assembly 300 through the wall 22 or the door 16. The method may include connecting the spindle 224 to the dial ring assembly 200 and the lock assembly 300. The method may include installing the power tube 228 comprising at least one conductor 226 electrically connecting the dial ring assembly 200 and the lock assembly 300.

As described above, some embodiments may be configured to utilize both alphabetic and numeric characters in combinations. The number of possible combinations for a three character alpha numeric combination is 2,000,376. Using a four character alpha numeric combination would yield a potential of 252,047,502 combinations. With that number of available combinations, a lock may accommodate at least ten users, each having a unique combination. In some embodiments, each user may be identified by a unique code, such as an alpha numeric code or other unique identifier, although this option may not be desired especially if each authorized user is instead given their own unique combination code for opening the lock.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. An electromechanical combination lock comprising:

a dial ring assembly including:

a housing configured to be mounted on an exterior of a securable enclosure, and a dial rotatably disposed on the housing, the dial being rotatable about a dial axis for use in connection with entry of a combination; and a lock assembly including:

a bolt, the bolt being selectively extendable and retractable, an internal generator configured to generate electrical energy, operatively coupled to the dial such that rotation of the dial causes the internal generator to produce electrical energy, and a sensor integrated into the internal generator and configured to detect both a rotation of the dial and a rotational speed of the dial;

wherein the sensor provides an output signal based at least in part on the rotation of the dial and the rotational speed of the dial, the rotational speed being represented by a temporal characteristic of the output signal; and wherein the sensor is configured to detect the rotation of the dial over a range of the dial rotational speeds.

2. The dial ring assembly of claim 1 wherein the sensor is a Hall effect sensor.

3. The dial ring assembly of claim 1 wherein the sensor is an optical sensor.

4. The dial ring assembly of claim 1 wherein the sensor is configured to detect a direction of the rotation.

5. The dial ring assembly of claim 1 wherein a resolution of the output signal of the sensor dynamically changes based on a rotation speed of the dial.

6. The dial ring assembly of claim 1, further comprising an external generator disposed in the housing and configured to generate electrical energy;
  wherein the external generator is operatively coupled to the dial such that rotation of the dial causes the external generator to produce electrical energy.

7. The dial ring assembly of claim 1, further comprising an electronic display disposed on the housing, the electronic display being configured to display at least one indicium associated with entry of the combination.

8. The dial ring assembly of claim 7, wherein the sensor is configured to communicate with the electronic display.

9. The dial ring assembly of claim 7, further comprising a processor, wherein the processor is configured to communicate with the sensor.

10. The dial ring assembly of claim 9, wherein the processor is configured to communicate with the electronic display.

11. A securable enclosure, comprising:
  a plurality of walls at least partially defining an interior;
  an access component arranged to selectively close an opening through the plurality of walls; and
  the electromechanical combination lock of claim 1 disposed on one of the door or one of the plurality of walls;
  wherein the electromechanical combination lock is configured to secure the door in a closed position.

12. A dial ring assembly for an electromechanical combination lock, the dial ring assembly comprising:
  a housing configured to be mounted on an exterior of a securable enclosure;
  a dial rotatably disposed on the housing, the dial being rotatable about a dial axis for use in connection with entry of a combination;
  an external generator disposed in the housing and configured to generate electrical energy; and
  a sensor integrated into the external generator and configured to detect both a rotation of the dial and a rotational speed of the dial;
  wherein the external generator is operatively coupled to the dial such that rotation of the dial causes the external generator to produce electrical energy;
  wherein the sensor provides an output signal based at least in part on the rotation of the dial and the rotational speed of the dial, the rotational speed being represented by a temporal characteristic of the output signal; and
  wherein the sensor is configured to detect the rotation of the dial over a range of the dial rotational speeds.

13. The dial ring assembly of claim 12 wherein the sensor is a Hall effect sensor.

14. The dial ring assembly of claim 12 wherein the sensor is an optical sensor.

15. The dial ring assembly of claim 12 wherein the sensor is configured to detect a direction of the rotation.

16. The dial ring assembly of claim 12 wherein a resolution of the output signal of the sensor dynamically changes based on a rotation speed of the dial.

17. The dial ring assembly of claim 12, further comprising an electronic display disposed on the housing, the electronic display being configured to display at least one indicium associated with entry of the combination.

18. The dial ring assembly of claim 17, wherein the sensor is configured to communicate with the electronic display.

19. The dial ring assembly of claim 17, further comprising a processor, wherein the processor is configured to communicate with the sensor.

20. The dial ring assembly of claim 19, wherein the processor is configured to communicate with the electronic display.

21. An electromechanical combination lock, comprising:
  the dial ring assembly of claim 12; and
  a lock assembly comprising a bolt, the bolt being selectively extendable and retractable.

22. A securable enclosure, comprising:
  a plurality of walls at least partially defining an interior;
  an access component arranged to selectively close an opening through the plurality of walls; and
  the electromechanical combination lock of claim 21 disposed on one of the door or one of the plurality of walls;
  wherein the electromechanical combination lock is configured to secure the door in a closed position.

23. A dial ring assembly for an electromechanical combination lock, the dial ring assembly comprising:
  a housing configured to be mounted on an exterior of a securable enclosure;
  a dial rotatably disposed on the housing, the dial being rotatable about a dial axis for use in connection with entry of a combination;
  an external generator disposed in the housing and configured to generate electrical energy; and
  a sensor integrated into the external generator and configured to detect a rotation of the dial;
  wherein the external generator is operatively coupled to the dial such that rotation of the dial causes the external generator to produce electrical energy;
  wherein the sensor provides an output signal based at least in part on the rotation of the dial;
  wherein the sensor is configured to detect the rotation of the dial over a range of dial rotational speeds; and
  wherein a resolution of the output signal of the sensor dynamically changes based on a rotation speed of the dial.

24. The dial ring assembly of claim 23 wherein the sensor is a Hall effect sensor.

25. The dial ring assembly of claim 23 wherein the sensor is an optical sensor.

26. The dial ring assembly of claim 23 wherein the sensor is configured to detect a direction of the rotation.

27. The dial ring assembly of claim 23, further comprising an electronic display disposed on the housing, the electronic display being configured to display at least one indicium associated with entry of the combination.

28. The dial ring assembly of claim 27, wherein the sensor is configured to communicate with the electronic display.

29. The dial ring assembly of claim 27, further comprising a processor, wherein the processor is configured to communicate with the sensor.

30. The dial ring assembly of claim 29, wherein the processor is configured to communicate with the electronic display.

31. An electromechanical combination lock, comprising:
  the dial ring assembly of claim 23; and
  a lock assembly comprising a bolt, the bolt being selectively extendable and retractable.

32. A securable enclosure, comprising:
  a plurality of walls at least partially defining an interior;
  an access component arranged to selectively close an opening through the plurality of walls; and
  the electromechanical combination lock of claim 23 disposed on one of the door or one of the plurality of walls;

wherein the electromechanical combination lock is configured to secure the door in a closed position.

33. A method of operating an electromechanical combination lock, the method comprising:

choosing between at least two modes associated with a combination necessary for a user to input for unlocking the lock, wherein the inputted combination appears on an electronic display disposed on a housing of a dial ring assembly, each mode including a type of indicium associated with the inputted combination;

entering the combination by rotating a dial disposed on the dial ring assembly about a dial axis, wherein rotating the dial comprises producing electrical energy by rotating an external generator shaft of an external generator disposed in the housing of the dial ring assembly and generating an output signal based at least partly on the rotation of the dial; and viewing the inputted at least one indicium associated with the combination on the electronic display.

34. The method of claim 33, wherein entering the combination comprises axially displacing the dial along the dial axis in a single press to actuate at least one switch.

35. The method of claim 33, wherein entering the combination comprises axially displacing the dial along the dial axis in a double press to change between the modes.

36. The method of claim 33, wherein entering the combination comprises activating a switch to change between the modes.

37. The method of claim 33, wherein entering the combination comprises viewing one of the types of indicium including a random alphabetic character, a random numeric character, and a random symbol, selecting one of the modes including an alphabetic mode, a numeric mode, and a symbol mode, and entering a combination element.

38. The electromechanical combination lock of claim 21;

wherein the lock assembly further comprises an internal generator;

wherein the internal generator is configured to generate electrical energy; and wherein the internal generator is operatively coupled to the dial such that rotation of the dial causes the internal generator to produce electrical energy.

39. The electromechanical combination lock of claim 31;

wherein the lock assembly further comprises an internal generator;

wherein the internal generator is configured to generate electrical energy; and wherein the internal generator is operatively coupled to the dial such that rotation of the dial causes the internal generator to produce electrical energy.

* * * * *